(12) United States Patent
Follmar

(10) Patent No.: US 7,757,424 B2
(45) Date of Patent: Jul. 20, 2010

(54) FISHING ROD HOLDER AND STEM MOUNT

(76) Inventor: William L. Follmar, 9144-7th Ave. South, Seattle, WA (US) 98108

(*) Notice: Subject to any disclaimer, the term of this patent is extended or adjusted under 35 U.S.C. 154(b) by 348 days.

(21) Appl. No.: 11/735,156

(22) Filed: Apr. 13, 2007

(65) Prior Publication Data

US 2007/0240358 A1  Oct. 18, 2007

Related U.S. Application Data

(60) Provisional application No. 60/744,872, filed on Apr. 14, 2006.

(51) Int. Cl.
*A01K 97/10* (2006.01)
(52) U.S. Cl. .................. 43/21.2; 248/521; 248/541
(58) Field of Classification Search ............ 43/21.2, 43/4.5; 248/514, 521, 535, 541
See application file for complete search history.

(56) References Cited

U.S. PATENT DOCUMENTS

| | | | |
|---|---|---|---|
| 1,985,985 A * | 1/1935 | Otto | ............... 224/200 |
| 2,890,847 A | 6/1959 | Minton et al. | |
| 3,792,829 A | 2/1974 | Fickett | |
| 4,198,775 A | 4/1980 | Leisner | |
| 4,586,688 A | 5/1986 | Hartman et al. | |
| 4,635,390 A | 1/1987 | Walters | |
| 4,827,654 A * | 5/1989 | Roberts | ............... 43/21.2 |
| 5,187,891 A | 2/1993 | Stanishewski | |
| 5,231,785 A | 8/1993 | Roberts | |
| 5,313,734 A | 5/1994 | Roberts | |
| 5,975,479 A | 11/1999 | Suter | |
| 6,269,584 B1 | 8/2001 | Peaschek | |
| 6,487,813 B2 | 12/2002 | Baynard et al. | |
| 6,561,471 B1 | 5/2003 | Hawie | |
| 6,571,507 B2 | 6/2003 | Elford | |
| 2007/0240358 A1 * | 10/2007 | Follmar | ............... 43/21.2 |

* cited by examiner

*Primary Examiner*—Christopher P Ellis
(74) *Attorney, Agent, or Firm*—Brian G Forrest; Hughes Law Firm, PLLC

(57) ABSTRACT

A rod holder mount adapted to hold a fishing rod support mechanism, the rod holder mount having a locking mechanism with an engagement feature positioned on the lateral portion where a stem portion of a fishing rod support mechanism can reposition the locking mechanism to an unlocked state and have it snap back to a locked state at a proper vertical orientation and the fishing rod support mechanism can be removed by repositioning the locking mechanism to an unlocked orientation with respect to the base portion.

18 Claims, 15 Drawing Sheets

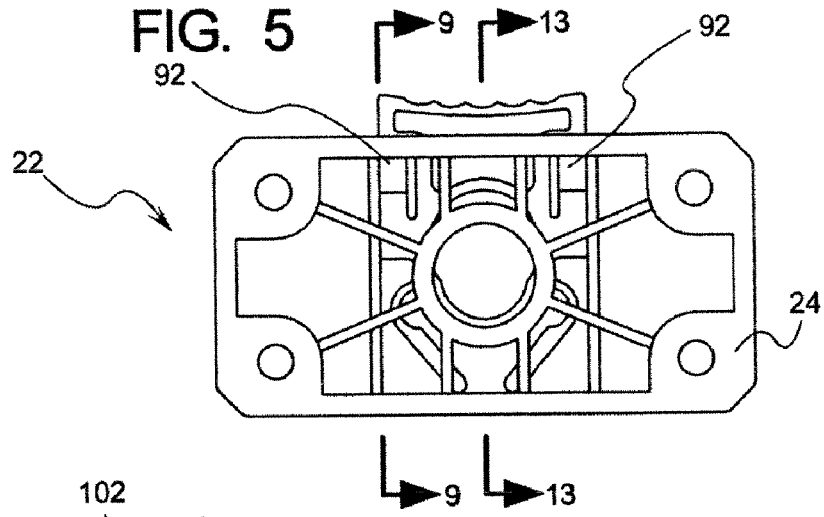
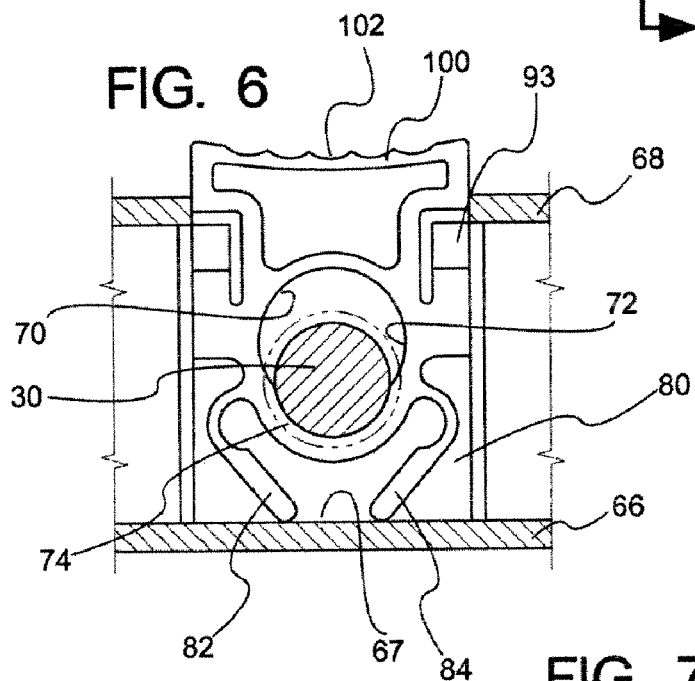
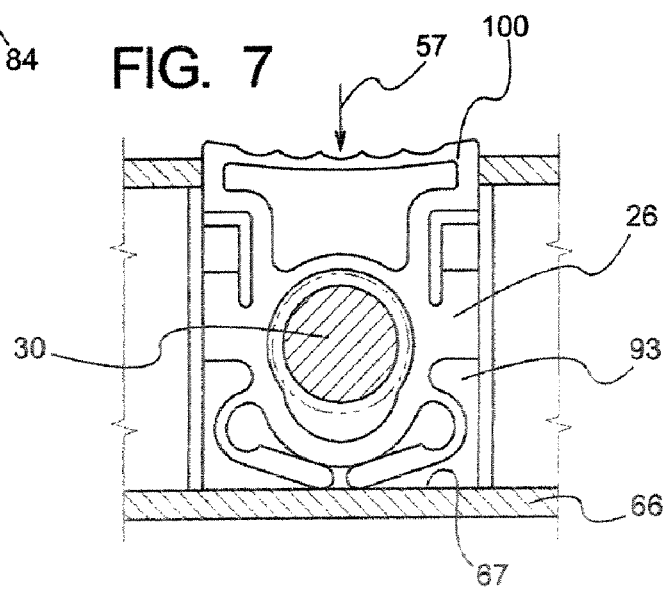

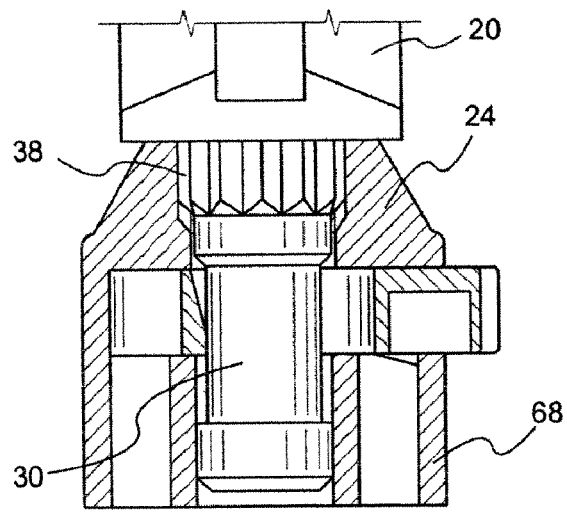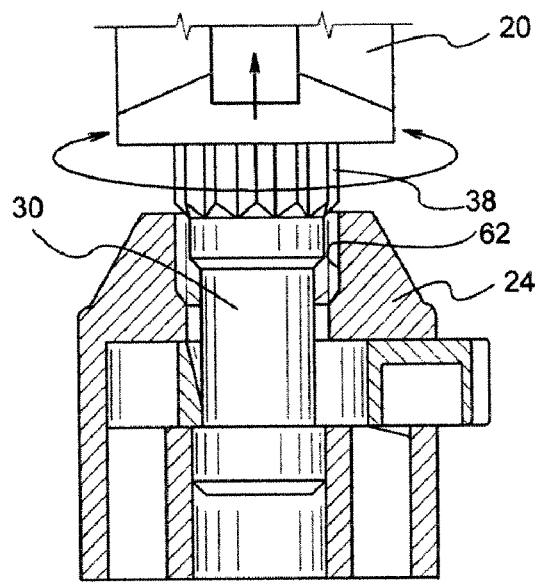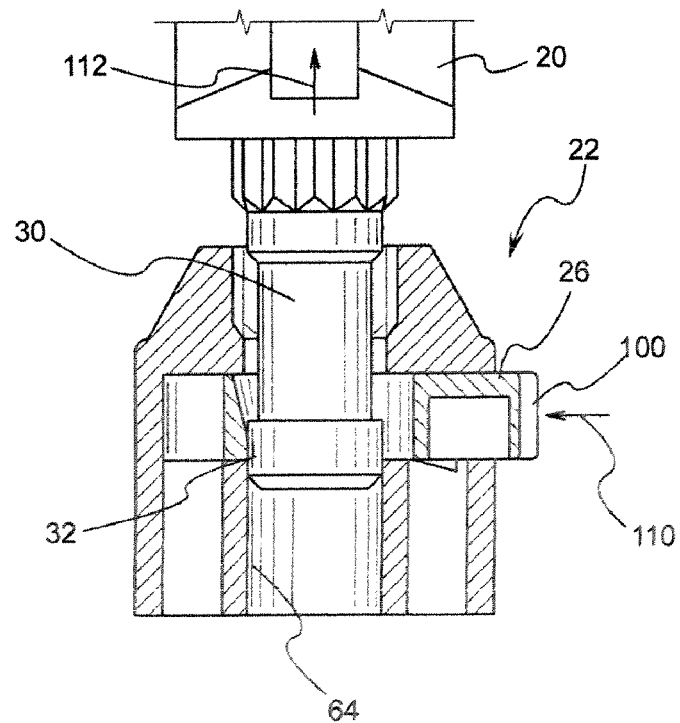

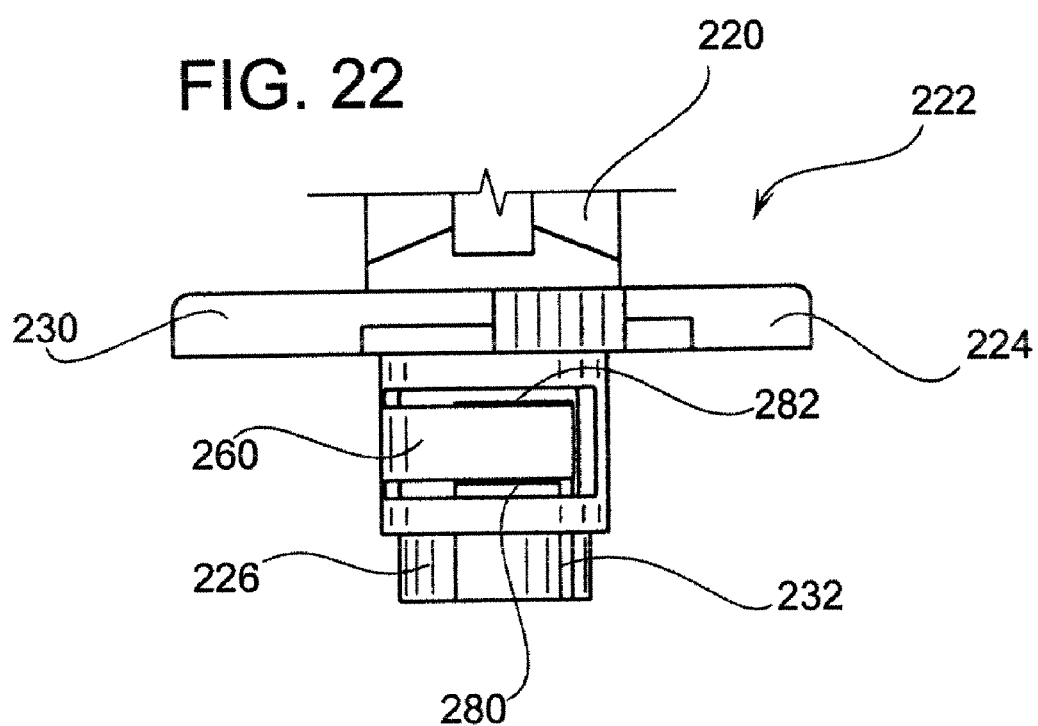

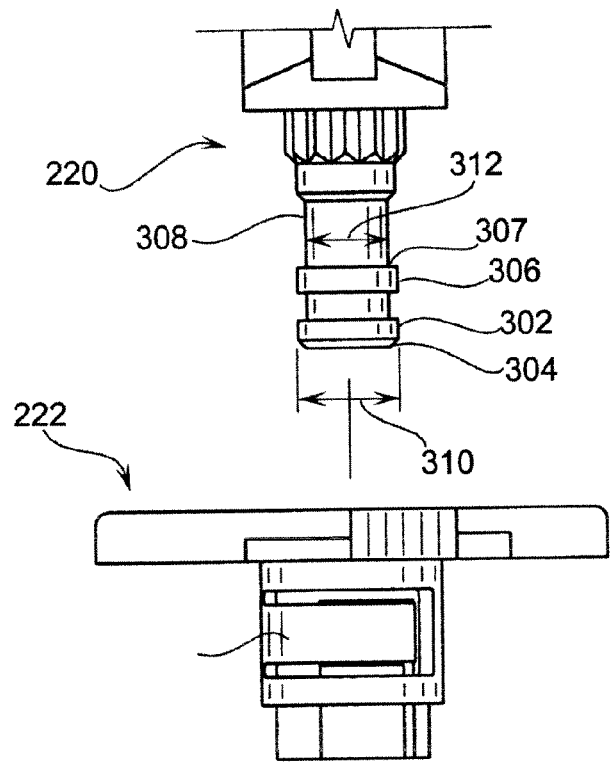
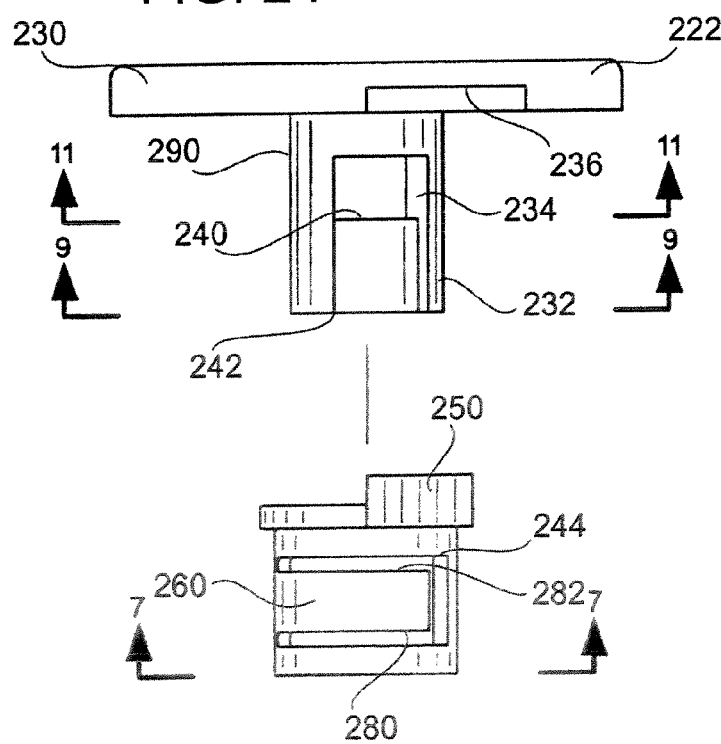

FIG. 25
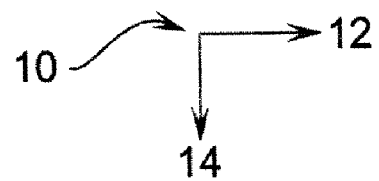
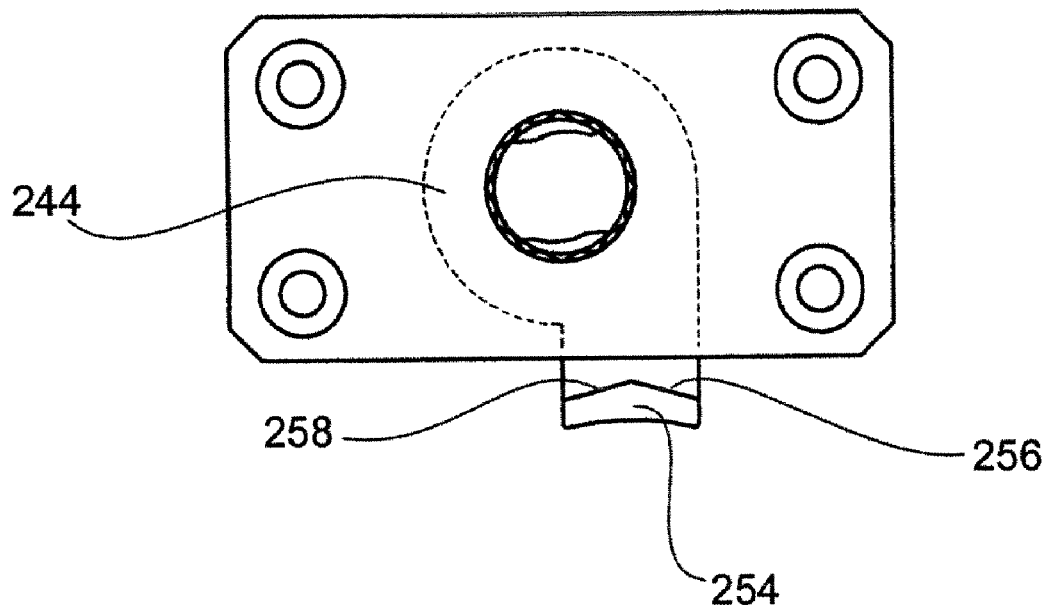
FIG. 26
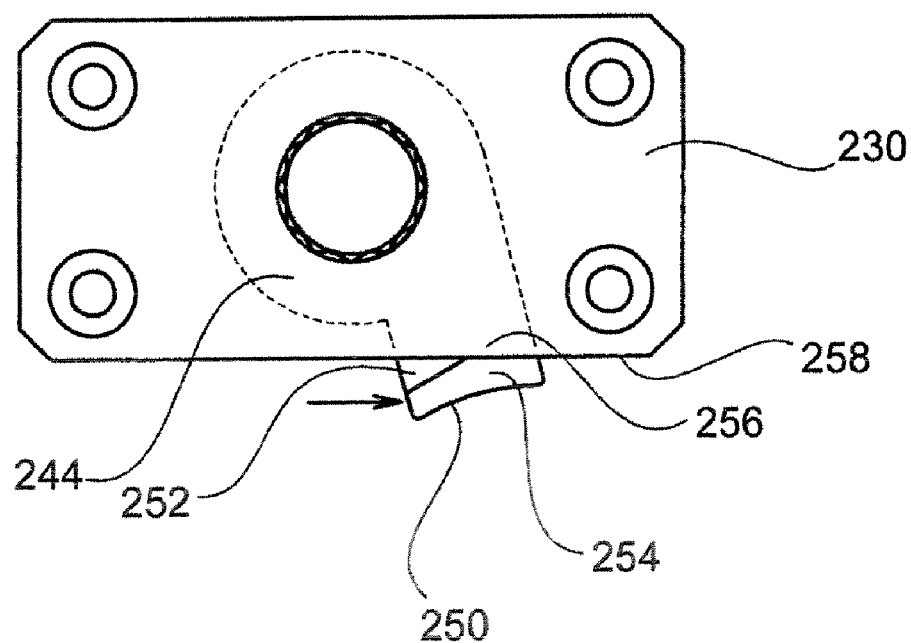

FISHING ROD HOLDER AND STEM MOUNT

RELATED APPLICATIONS

This application claims priority of U.S. Provisional Ser. No. 60/744,872, filed Apr. 14, 2006, and U.S. Ser. No. 11/459,713, filed Jul. 25, 2006.

BACKGROUND

Fishing rod holder base/support mounts have been utilized in the prior art for holding and securing a fishing rod support mechanism. In general, a fishing rod holder mount is adapted to receive a cylindrical stem from any fishing rod support mechanism that extends downwardly therein.

Various fishing rod holder bases have been utilized in various forms. In one prior art form, the rod support mechanism (the device that holds the fishing rod directly) is manipulated about a vertical axis where certain slots engage receiving extensions in the prior art rod holder mount to securely fasten a fishing rod support therein. Experience with such devices has shown that there have been occasions where a fishing rod support mechanism with the rod secured therein has been unintentionally removed from the rod holder mount and lost to the sea or lake. Therefore, as described herein, there is a more desirable rod holder mount where various features and benefits can be appreciated by a broad interpretation of the claims following a detailed discussion of a few examples of carrying out the invention where the broader scope of the invention is to be interpreted by the broadest terminology as recited by the claims.

SUMMARY OF THE DISCLOSURE in another embodiment, there is a rod holder mount operatively configured to be positioned upon a base to hold a fishing rod support mechanism having a stem. The rod holder mount has a base portion comprising a lock mechanism receiving surface, the lock mechanism receiving surface having a circular surface portion and a lock mechanism arm engagement surface. The rod holder mount further comprises a first lock mechanism having a lock mechanism attached to the base portion, the first lock mechanism arm comprising a base engagement surface that is operatively configured to engage the lock mechanism arm engagement surface such that when the mechanism repositions when pressed or rotated, the lock mechanism arm engages the base engagement surface to reposition the radially inward lock extensions radially outwardly sufficient to allow the stem of the rod support mechanism to pass therethrough.

In another form, the rod holder mount comprises a base stem having a surface defining an extension opening, where the radially inward lock extensions are configured to extend radially inward into the extension openings. The base extension of the base member may have an inward substantially conical surface operatively configured to engage the stem of the rod holder mount, the radially inward lock extension extending within a curved plane defined in part by an inward substantially conical surface of the stem when the lock mechanism is in a first position.

In another form, a lower frustoconical surface of the stem is operatively configured to reposition the first lock bar radially outwardly as the stem is positioned downwardly onto the base portion. Additionally, the first and second lock arms may be utilized and attached to the locking mechanism, or mounted to the lock mechanism by way of the cantilevered spring. The first and second lock arms may each have a base engagement surface which slidably engages a first and second lock mechanism arm engagement surface of the base portion to reposition the lock arms radially outwardly to remove or attach the stem to the base portion.

BRIEF DESCRIPTION OF THE DRAWINGS

FIG. 5 shows a bottom view of the rod holder mount;

FIG. 6 shows a partial sectional view of the locking mechanism in a locked orientation;

FIG. 7 shows the locking mechanism in an open orientation where the biasing region is in a high-energy stored state and counteracted by a lateral force in some form;

FIG. 17 shows the rotational locking surface of the stem engaged to the stem locking surface of the base portion to rotationally fix the fishing rod support mechanism thereto;

FIG. 18 shows the stem repositioned vertically where rotation about a vertical axis of the fishing rod support mechanism is possible;

FIG. 19 shows the locking mechanism positioned in an unlocked state which in one form is executed by pressing the extension and removal of the fishing rod support mechanism or more specifically the stem therefrom;

FIG. 22 shows a profile view of the base portion of another embodiment shown in FIGS. 22-39;

FIG. 23 shows the stem position above the rod holder mount;

FIG. 24 shows the base portion in the exploded view where the locking mechanism is positioned beneath the base platform;

FIG. 25 has a top view of the base portion in a relaxed orientation;

FIG. 26 shows the head portion repositioned in a disengaged orientation;

DETAILED DESCRIPTION OF THE PREFERRED EMBODIMENTS

Figure 1:
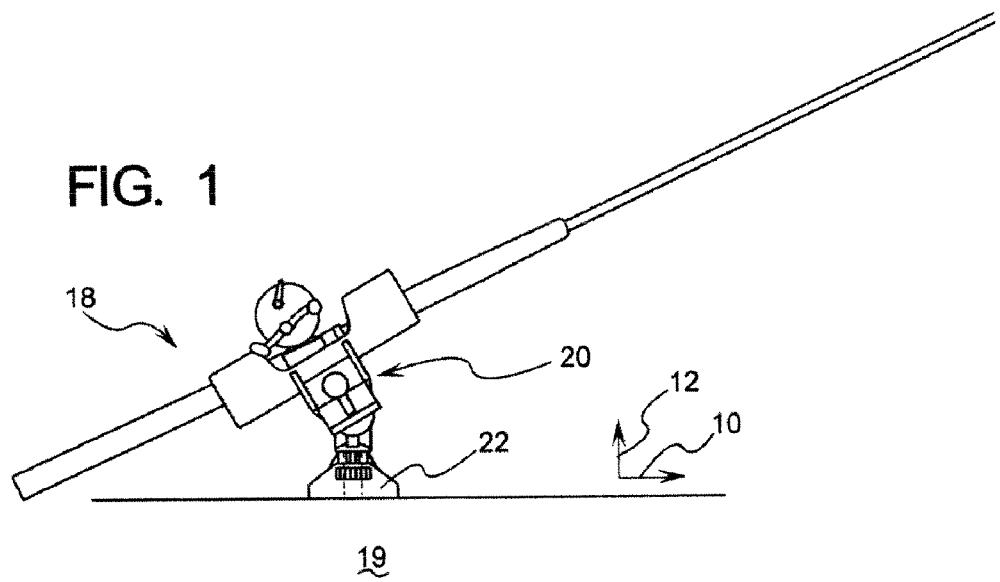
FIG. 1 shows a side view of a fishing rod holder assembly mounted to the base such as the perimeter portion of a water vessel or an edge of a dock.
Figure 3:
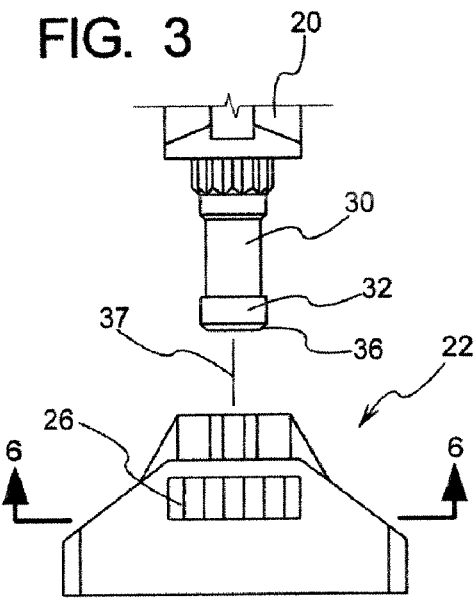
FIG. 3 shows a stem portion of the fishing rod support mechanism positioned above the rod holder mount.

As shown in FIG. 1, there is a fishing rod support mechanism 20 mounted to the rod holder mount 22. In one form, this is a fishing rod support mechanism similar to that shown in Ser. No. 10/989,189, which is hereby incorporated by reference. As shown in FIG. 3, the rod holder mount 22 comprises a base portion 24 and a locking mechanism 26. There will first be a general discussion of the apparatus followed by a more detailed description of the various components thereof. To aid in description of the general components, an axes system is defined where as shown in FIG. 1, the arrow indicated at 10 indicates a longitudinal axis. The arrow indicated at 12 indicates a vertical axis. Now referring to FIG. 4, the substantially orthogonal axis (to that of axes 10 and 12) indicated at 14 indicates a lateral direction pointing in a first lateral direction. Of course the axes described above are not intended to specifically limit the claimed invention but rather are utilized to aid in the description and orientation of the various components.

Figure 2:
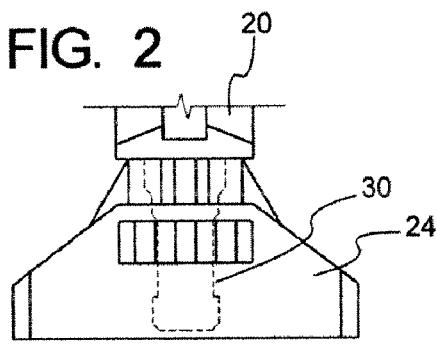
FIG. 2 is a view of the base portion with the stem shown therein as a hatched line.
Figure 15:
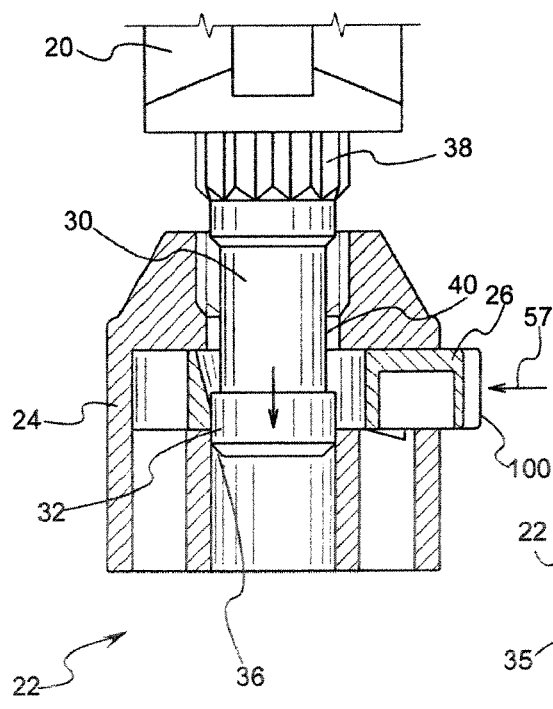
FIG. 15 shows the locking mechanism repositioned to an unlocked orientation as the lower annular lip repositions the locking mechanism to this orientation.
Figure 16:
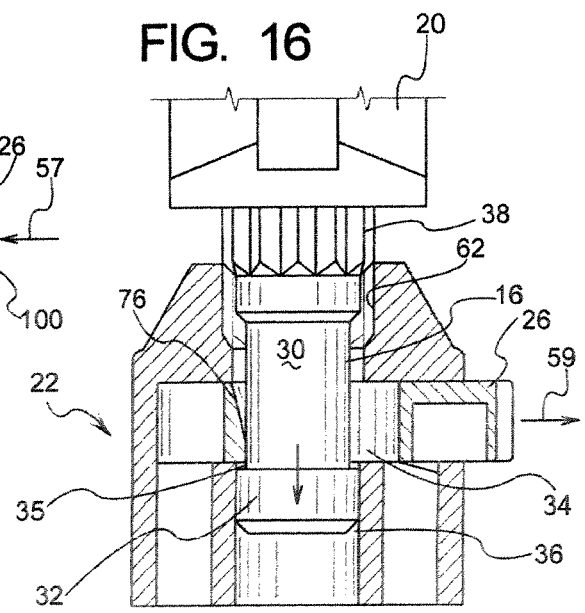
FIG. 16 shows the locking mechanism in a locked state where it is snapped in a second lateral direction and the stem is retained therein.

As shown in FIG. 3, it can be seen how the stem 30 is positioned above the rod holder mount 22. In operation, the stem 30 is inserted downwardly within the surface defining a vertically orientated opening 60 (see FIG. 4) to a position as shown by the hatched line in FIG. 2. As shown in FIG. 15, the lower annular lip 32, having in one form a frustoconical surface 36, is adapted to reposition the locking mechanism 26 to an unlocked position. As shown in FIG. 16, as the fishing rod support mechanism is further repositioned downwardly the lower annular lip is positioned beneath the locking mechanism 26 where it is locked therein. As further shown in this figure, and more specifically in FIG. 18, a rotational locking surface 38 of the stem is positioned vertically above a stem locking surface 62 of the base portion 24. This allows for rotation of the fishing rod support mechanism 20 as indicated by the circular arrow. When it is desirable to rotationally lock the fishing rod support mechanism 20 to the base portion 24, the fishing rod support mechanism is positioned downwardly in a manner as shown in FIG. 17. When the fishing rod support mechanism 20 is desired to be removed from the rod holder mount 22, the locking mechanism 26 is repositioned such that in one form, the protruding release 100 is depressed as indicated by arrow 110 in FIG. 19, so the first portion of the inner surface of the locking mechanism allows free passage of the lower annular lip 32 for removal thereof.

FIG. 3 further shows the lower portion of the fishing rod support mechanism 20 where a stem 30 is shown. Essentially, the stem 30 has a lower annular lip 32 where as shown in FIG. 16, it comprises an upper lock surface 34 and a lower frustoconical surface 36. As shown in FIG. 15, a rotational locking surface 38 is provided which in one form is positioned above an elongated portion 40. In general, the elongated portion 40 has a smaller diameter or cross-sectional area than that of the lower annular lip 32. As described further herein, this allows for rotation of the fishing rod support mechanism 20 while the fishing rod support mechanism 20 is locked to the rod holder mount 22 as described further herein.

Figure 20:
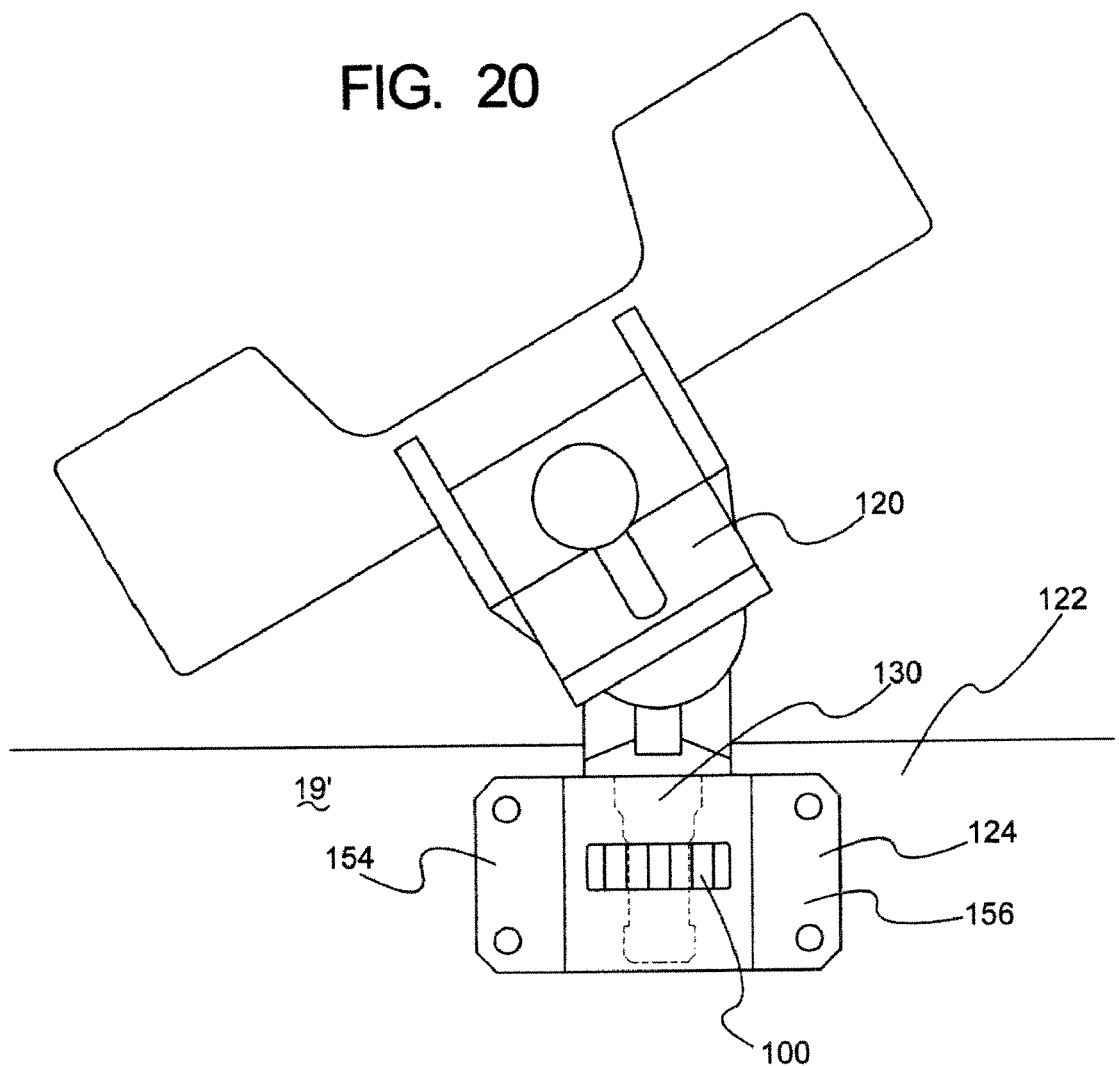
FIG. 20 shows one possible variation where the base portion is mounted on the side of an object such as a shipboard dock.

Referring back to FIG. 4, the base mount 24 comprises an attachment region 50 which comprises a first attachment portion at a first longitudinal location 52 and a second attachment (or mounting) portion at a second longitudinal location indicated at 54, surfaces defining the openings 56 are provided to allow such fasteners as screws or nuts and bolts to pass therethrough to fixedly mount the rod holder mount 22 to a base 19 as shown in FIG. 1 as well as shown in FIG. 20 showing another embodiment described further herein.

Figure 4:
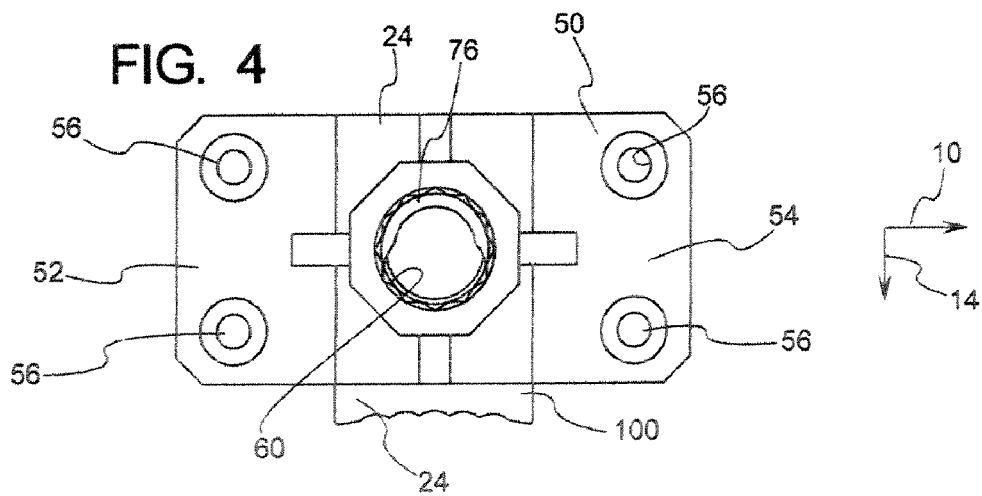
FIG. 4 shows a top view of the rod holder mount.
Figure 13:
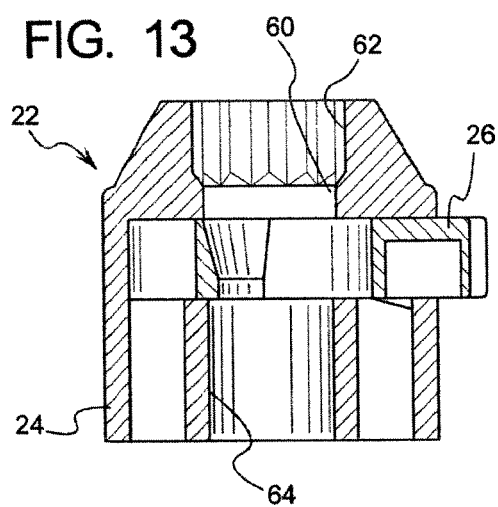
FIG. 13 shows a sectional view taken at line 13-13 of FIG. 5 showing the stem locking surface and the upper portion of the surface defining a vertically oriented opening.

As shown in FIG. 4, there is a surface defining a vertically orientated opening 60. As shown in FIG. 13, the surface 60 as an upper portion 62 which comprises a stem locking surface. The lower portion of 64 is adapted to engage the outer surface of the lower annular lip 32 as shown in FIG. 16-18. Generally, the outer cylindrical surface of the lower annular lip 32 to engage the surface portion 64 so the stem can reposition therein; however, engagement between the lower annular lip and the surface 64 prevents rotation about an axis and the horizontal plane. The extension 100 is shown positioned in a lateral direction as shown in FIG. 4. However, it can be appreciated that it can be orientated in the longitudinal direction (to the left and right) or other oblique directions. As further shown in FIG. 13, the stem locking surface 62 is located in the upper portion of the surface defining a vertically oriented opening 60. However, in another form, the surface could be positioned near the lower region 64 where a corresponding tooth-like surface such as that shown as the rotational locking surface 38 of the stem is positioned in the lower portion of the stem 30.

As shown in FIGS. 5-7, the base portion 24 comprises a first lateral wall 66 and a second lateral wall 68. The first lateral wall has an inner surface 67 and as best shown in FIGS. 9-12, the second lateral wall 68 has an inner surface 69 which is adapted to engage a lock extension 90 of the lock mechanism described further herein.

Figure 8:
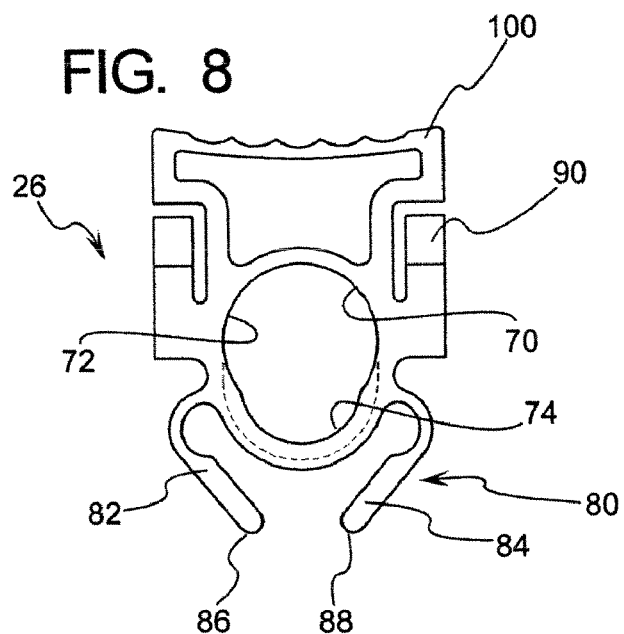
FIG. 8 shows a top view of one form of a locking mechanism.
Figure 9:
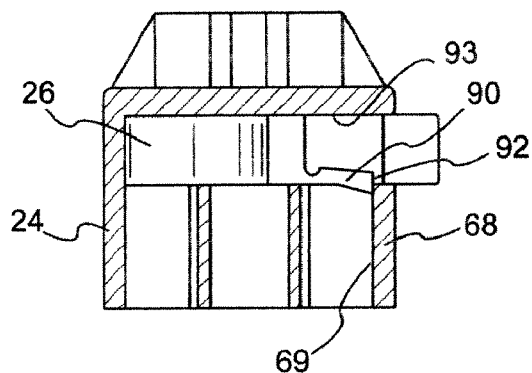
FIG. 9 is taken at line 9-9 of FIG. 5 showing the lock extension locking the locking mechanism to the base portion.

There will now be a discussion of the locking mechanism 26 with initial reference to FIG. 8. In one form, the locking mechanism 26 is a unitary structure comprising an inner surface 70 having a first portion 72 and a second portion 74. The first portion 72 is of a sufficient diameter and cross-sectional opening to allow the lower annular lip to pass therethrough. The second portion 74 has a reduced size diameter and is adapted to engage the elongated portion 40 (see FIG.

16) of the stem 30 and engage the upper lock surface 34 of the lower annular lip to lock the stem to the rod holder mount 22. As shown in FIGS. 13-16, the locking mechanism 26 comprises an angled surface 76 that is adapted to engage the frustoconical surface 36 of the lower annular lip 32 so the locking mechanism is repositioned by a downward action of the stem 30 as described further herein.

Referring back to FIG. 8, the locking mechanism 26 further comprises a biasing region 80. The biasing region 80 comprises, in one form, a leaf spring-like member referred to as a biasing member 82 and further can include a second biasing member 84. In one form, the members 82 and 84 are of a unitary structure with the locking mechanism 26. The members 82 and 84 have surfaces 86 and 88 that in one form are adapted to engage the inner surface 67 of the first lateral wall 66 as shown in FIGS. 6-7. Of course various spring-like elements can be employed, and the biasing region 80 can be that of a unitary structure with the lock mechanism, or a separate structure, or integral with the base portion 24.

Figure 10:
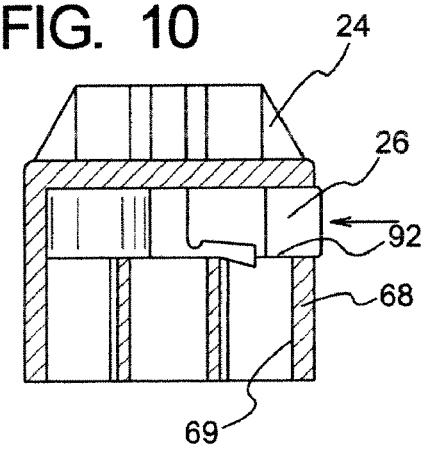
FIG. 10 shows the locking mechanism in an unlocked orientation.
Figure 11:
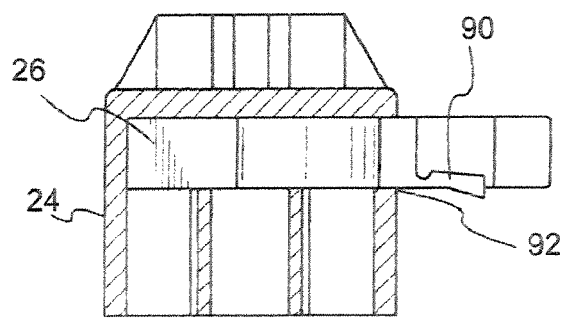
FIG. 11 shows the locking mechanism position partially removed from the cavity portion of the base portion.
Figure 12:
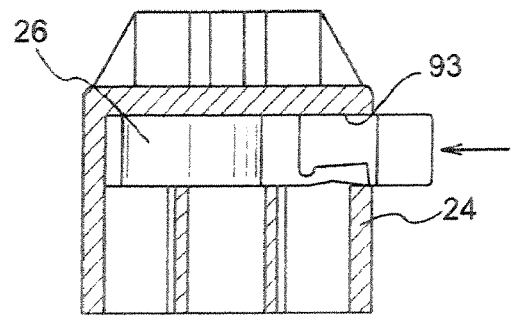
FIG. 12 shows the locking mechanism being positioned in the cavity portion where the lock extension is temporarily repositioned in a manner to allow the locking mechanism to be inserted into the cavity portion.

Referring back to FIG. 8, in one form, a lock extension 90 is provided where as shown in FIGS. 9-12, the lock extension 90 is adapted to hold the lock mechanism 26 in the base portion 24. As shown in FIG. 11, in one form the lock mechanism 26 is of a unitary structure such as a plastic injected molded part, the lock extension 90 comprising a lock surface 92. As shown in FIG. 12, as the lock mechanism 26 is inserted into the cavity portion 93 of the base portion 24, the lock extension is repositioned as shown in this figure. In a preferred form, the lock extension does not undergo plastic deformation but merely temporarily deforms into this state, and when fully inserted into the cavity region 93, extends to its original position where the lock surface 92 engages the inner surface 69 of the second lateral wall 68. As shown in FIG. 5, the lock extension 92 (where in one form two are provided on either longitudinal portion of the unit) are accessible from the lower view of the rod holder mount 22. Therefore, when the rod holder mount is removed from the base 19 as shown in FIG. 1, the locking mechanism can be removed by merely depressing the lower surface of the lock extension 92 and removing the unit from the cavity 93 (see FIG. 11). As shown in FIG. 10, the lock surface 92 can freely disengage from the surface 69 during the normal operation of the locking mechanism 26. In one form, the surface 92 limits the range of travel in the locked position of the locking mechanism 26 with respect to the base portion 24. Of course, it can be appreciated that the lock extension 90 can function in a variety of forms other than that shown in FIGS. 8-12. For example, the lock extension could be a portion of the base portion such as that located in the upper portion of the cavity 93 which would lock to an inner surface of the locking mechanism 26. Furthers the extension could be positioned and engage other services other than the inner surface wall indicated at 69. For example, the lock extension could be positioned on the other lateral portion of the locking mechanism 26.

Referring back to FIG. 8, the locking mechanism further comprises a protrusion or protruding release 100. The protrusion in one form is adapted to extend from the second lateral wall 68 such as that shown in FIG. 6. In one form, the protrusion 100 has a nonplanar surface 102 such as that shown in the various figures which allows for better frictional engagement as well as a tactile feel to the user to know when he is depressing the protrusion. Of course the protrusion could be recessed within the cavity 93 were the fishermen pressures the protrusion inwardly into the cavity 93 of the base portion 24. In this scenario, instead of the open unlocked position as shown in FIG. 7, the protrusion would be, for example, embedded within the surface of the second lateral wall 68.

Figure 21:
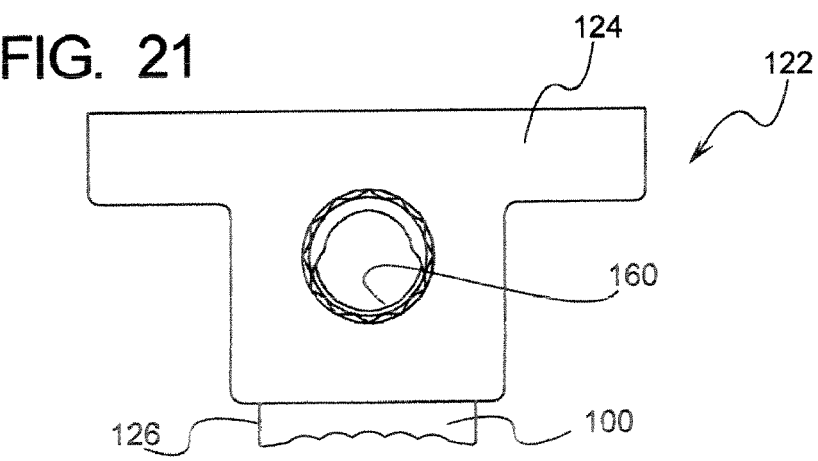
FIG. 21 is a top view of the rod holder mount of the second embodiment.
Figure 27:
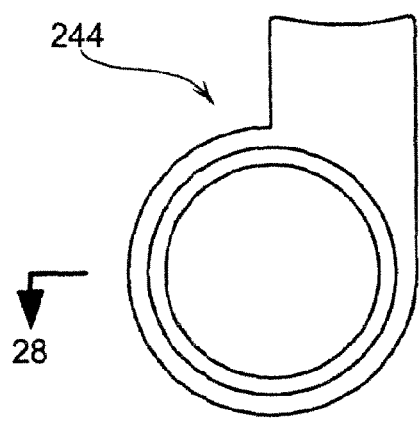
FIG. 27 shows a top view of the lock mechanism.

As shown in FIGS. 20-21, there is another embodiment where the base portion 124 is positioned on a substantially vertical surface base 19'. The first and second longitudinal mounting regions 154 and 156 are positioned in a manner to mount the surface 19' which can be vertical or perhaps even angled such that, as shown in FIG. 21, the surface defining a vertically oriented opening 160 is substantially similar to the previous embodiments where the vertically oriented opening need not be perfectly vertical as in assembler embodiments but only somewhat vertical to allow the fishing rod support mechanism 120 to be mounted therein. The protrusion 100 is mounted away from the substantially vertical surface 19' and operates in a similar manner as described above to engage and disengage the stem 130 from the rod holder mount 122.

Figure 14:
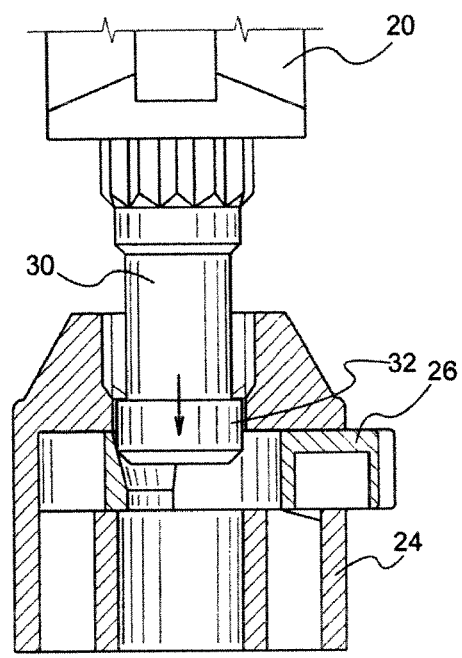
FIG. 14 shows the stem and more particularly the lower annular lip repositioning the locking mechanism in a first lateral direction.

In operation, as introduced in the initial part of this disclosure, the rod holder mount 22 operates in a manner to allow the fishing rod support mechanism 20 shown in FIG. 1 to be repositioned downwardly into the base portion 24 as shown in FIG. 3 with, in one form, by only using one hand of the fishermen or person handling the rod and the fishing rod support mechanism 20. Essentially, as shown in FIG. 4, the angled surface 76 of the lock mechanism is adapted to engage the lower portion of the lower annular lip 32 (see FIG. 3). In one form, the lower annular lip 32 has the frustoconical surface 36 to assist in repositioning the locking mechanism 26 to an open position. However, any combination of the surfaces 36 and 76 can be employed to impart a lateral force as indicated by arrow 57 in FIG. 7. As shown in FIG. 14, the lower annular lip 32 is shown engaging the locking mechanism 26 and biasing it into an open orientation as the stem 30 repositions downwardly. As shown in FIG. 15, the stem 30 is positioned in a manner where the lower annular lip 32 has biased the locking mechanism 26 to an open orientation. It should be noted that the force indicated at 57 is not necessarily provided by way of the fisherman with his or her other free hand. Rather, with merely downward force of the stem 30, the stem can be locked to the base portion 24. However, the fisherman or other participant can assist in the insertion of the fishing rod support mechanism 20 into the base portion 24 by way of pressing the protrusion 100 laterally inwardly as indicated by arrow 57.

As shown in FIG. 16, the stem 30 continues downwardly and once the lower annular lip 32 passes the locking mechanism 26, the locking mechanism biases laterally outwardly as indicated by arrow 59 and the locking surface 35 on the upper portion of the lower annular lip is now adapted to engage the lower surface of the locking mechanism 26 so the fishing rod support mechanism, or more specifically a stem 30, is locked thereto. It should be noted in the orientation as shown in FIG. 16, the rotational locking surface 38 of the stem is not engaging the stem locking surface 62 so the fishing rod support mechanism 20 can rotate as indicated by circular arrow in FIG. 18. When a desirable rotational position above the vertical axis 37 (see FIG. 3) is obtained, the stem 30 is positioned downwardly in an orientation as shown in FIG. 17. When the fisherman or individual that is otherwise operating and maintaining the fishing rod holder assembly 18 (see FIG. 1) desires to remove the fishing rod support mechanism 20 or more specifically the stem 30 from the rod or mount 22, he or she merely repositions the locking mechanism 26 as indicated by arrow 110 so the first portion 72 of the inner first surface 70 (see FIG. 6) is in alignment with the lower surface 64 and the lower annular lip can freely pass vertically as indicated by the arrow 112.

Now referring to FIGS. 22-39, the general operation of mounting the fishing rod support mechanism 220 to the base portion 222 is shown in another embodiment.

As shown in FIG. 22, the base portion 222 is shown with a portion of the rod support mechanism 220 shown thereabove. In general, the base portion 222 comprises a base platform 230 and a base extension 232. As shown in FIG. 24, it can be seen that the base platform 230 has a surface defining an opening 236 which is operatively configured to have the extensions 260 and 262 of the lock mechanism 44 extend therethrough.

Figure 30:
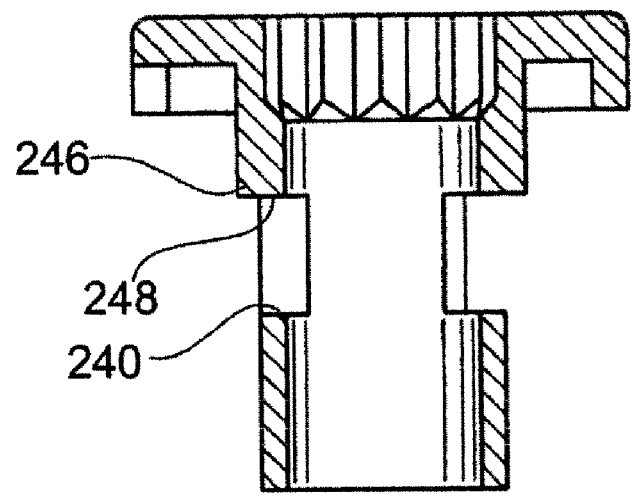
FIG. 30 shows a cross-sectional view of the base platform.
Figure 31:
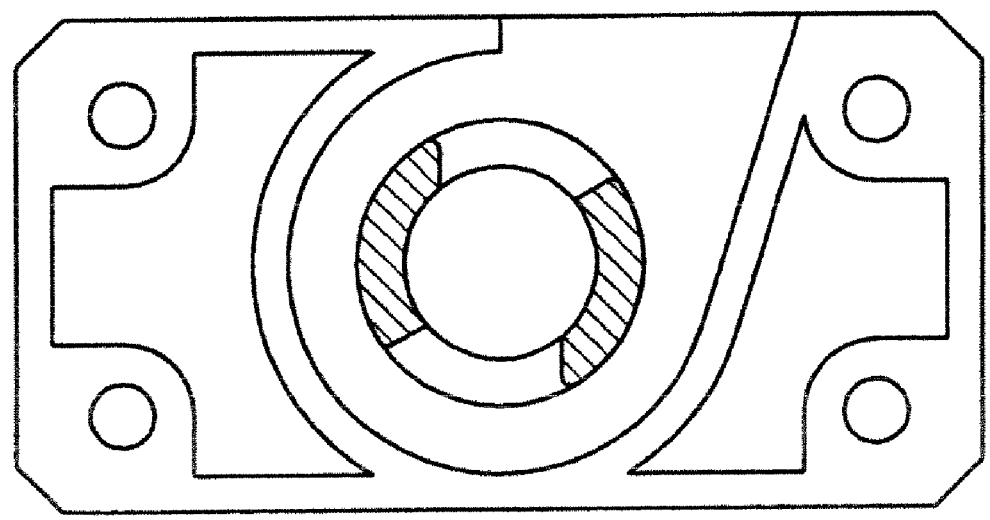
FIG. 31 shows a sectional view in particular showing the engagement surfaces which in one form are utilized to separate the lock arms of the lock mechanism.
Figure 32:
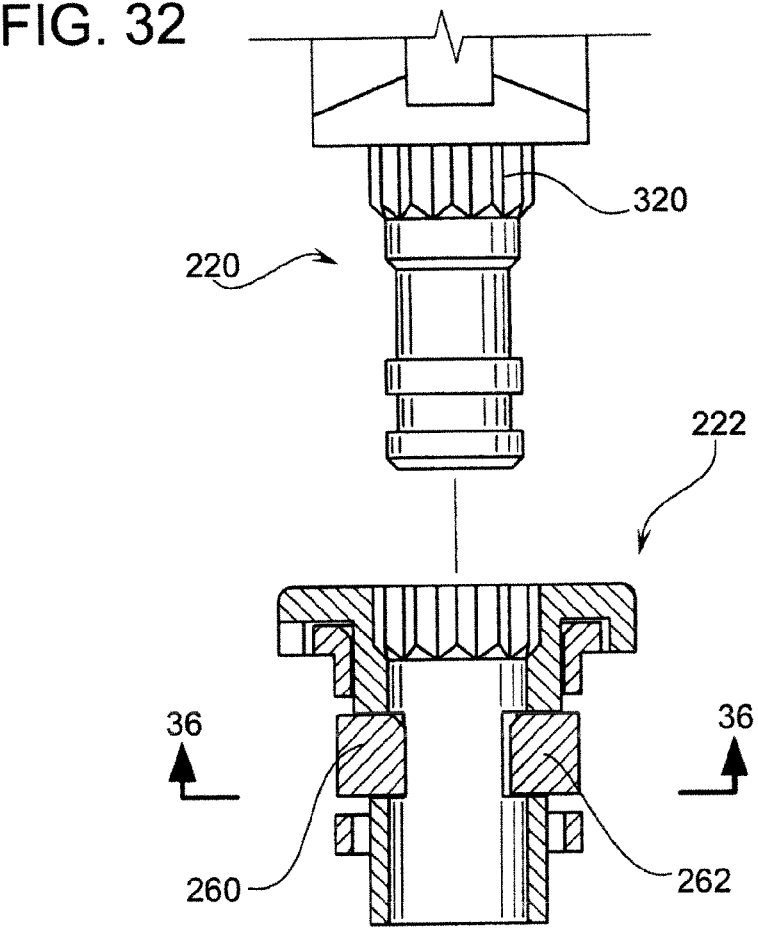
FIG. 32 shows the fishing rod support mechanism positioned above the rod holder mount in a partial sectional view.
Figure 33:
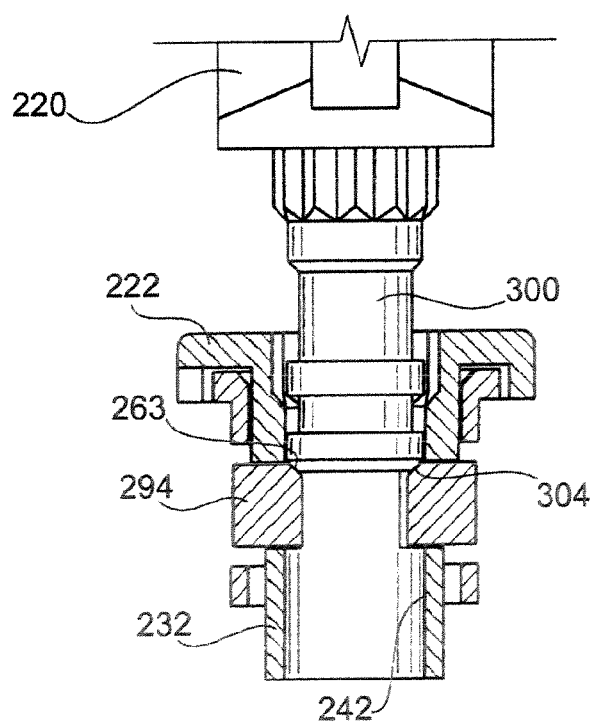
FIG. 33 illustrates how the frustoconical portion of the lower region of the stem can engage the upper surface of the lock arms of the lock mechanism.
Figure 34:
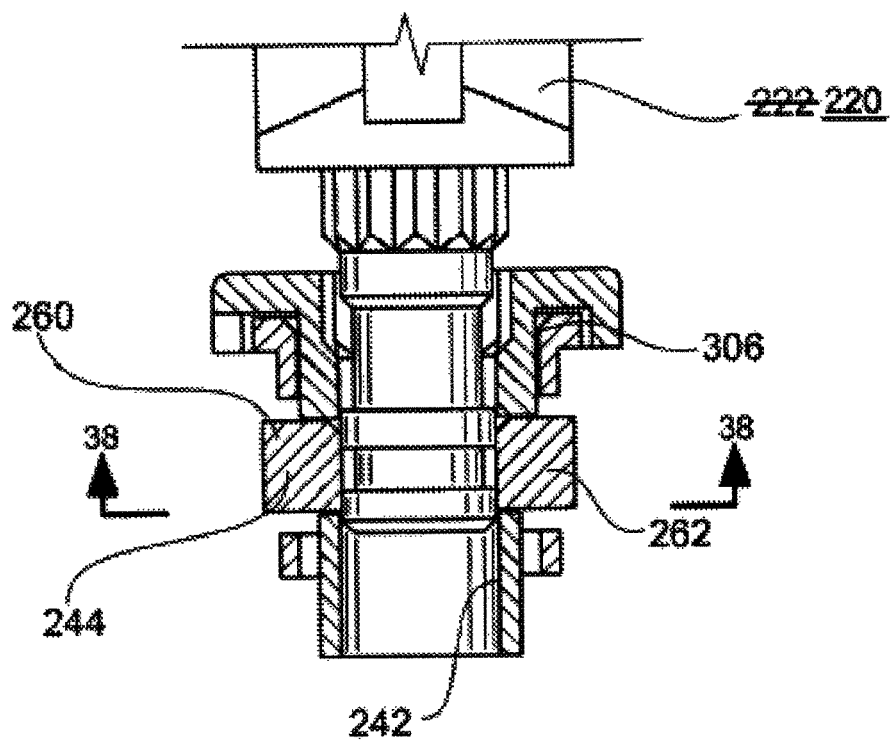
FIG. 34 shows the lock arms in a separated orientation.
Figure 35:
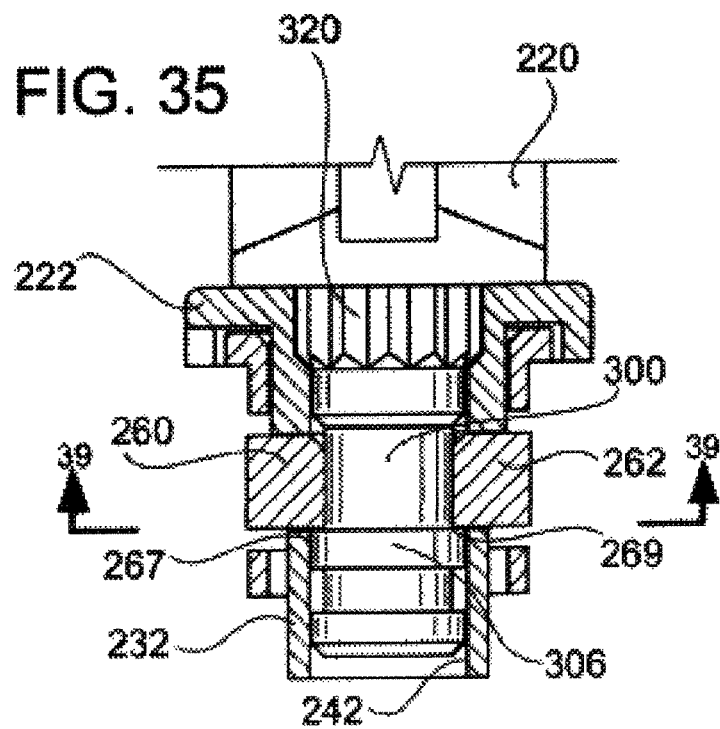
FIG. 35 shows a final sectional view and a progressive set of views from FIGS. 32-35 where the lock arms secure the stem in the central chamber region.
Figure 36:
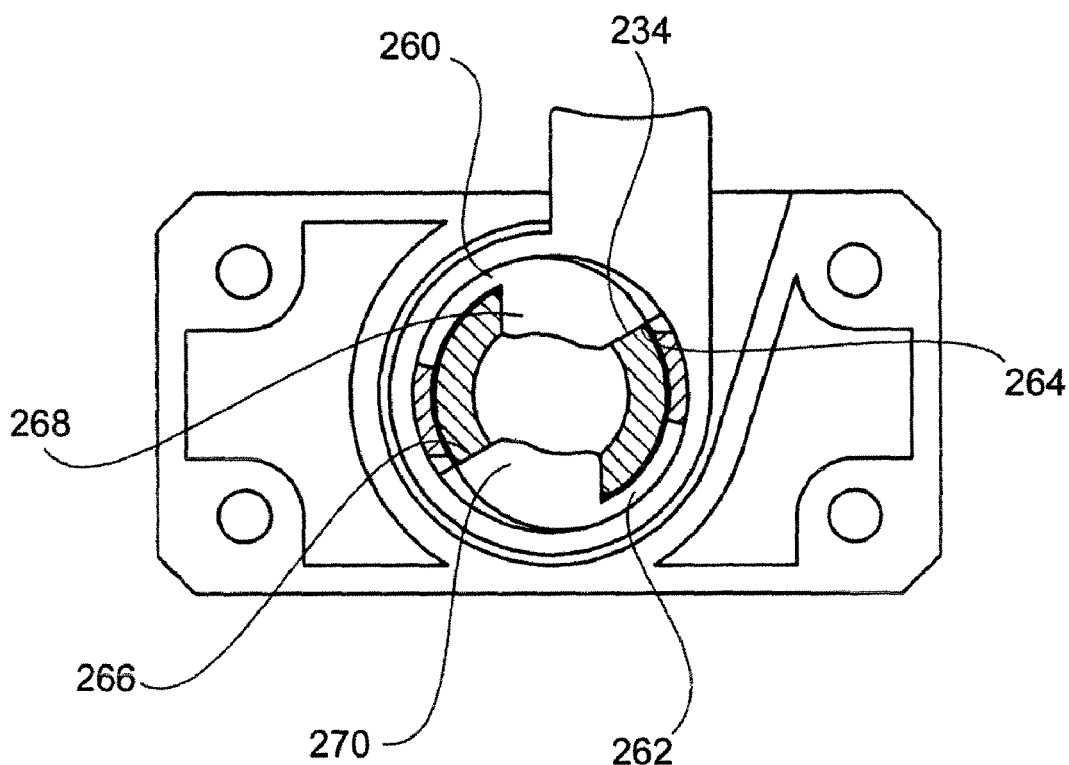
FIG. 36 is a partial sectional view showing the lock arms in a relaxed state where the interior surface is within the central chamber region.
Figure 37:
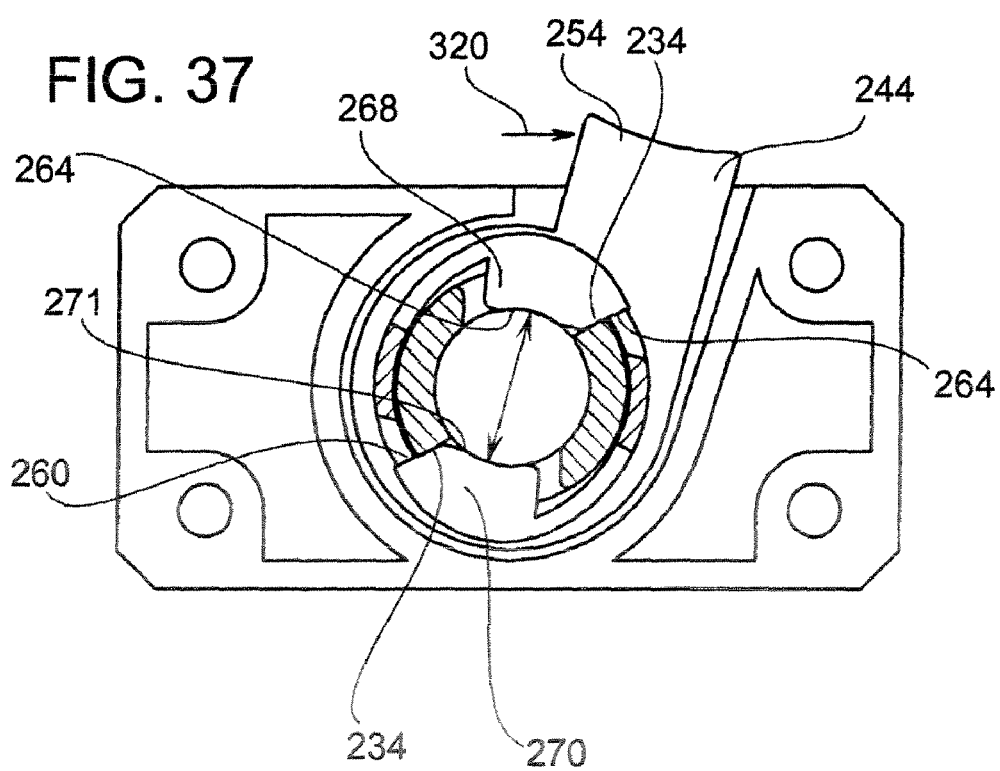
FIG. 37 shows the lock mechanism in a stored energy state where the lock arms are positioned radially outwardly.

The base extension 232 comprises a lock mechanism engagement surface 234. As further shown in FIG. 24, the base extension 232 further comprises a surface defining an extension opening 240 which is configured to receive the radially inward lock extensions 260 and 262 of the lock mechanism 244 described further below. It should be further noted that the inward substantially conical surface 242 of the base extension 232 is adapted to receive and position the stem 300 as shown in FIGS. 33-35. In one form, there is a relatively close engagement between the outer surface of the stem 300 and the inward surface 242. As shown in FIG. 30, the upper surface 246 helps define an arm receiving slot 248 which is adapted to house the lock mechanism 244, which will now be described in detail.

Figure 39:
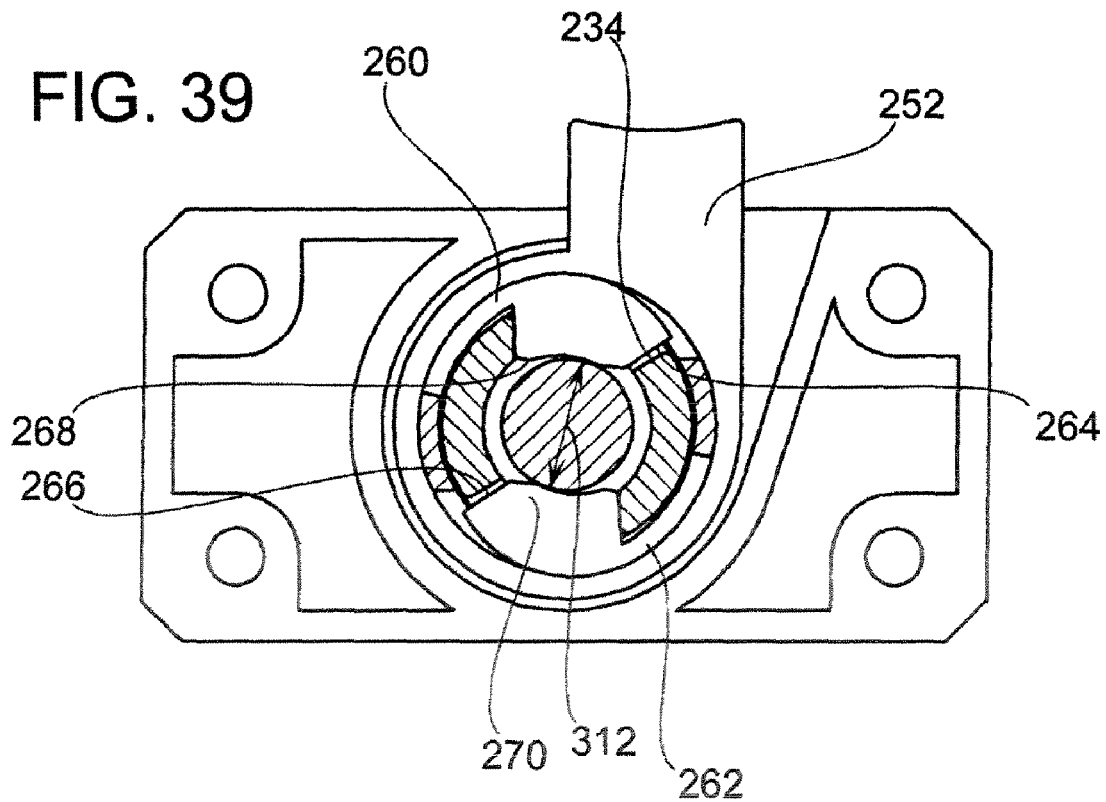
FIG. 39 illustrates how the lock arms position radially inwardly to retain the stem in the base portion.

Referring back to FIG. 24, the lock mechanism 244 is shown where the lock mechanism 244 comprises an engagement surface 250 which is connected to the extension 252 as is best shown in FIG. 39. As shown in FIGS. 25 and 26, the engagement surface 250 is attached to the extension 52 which is received within the surface defining the opening 236 of the base portion 222. As is further shown in FIGS. 25 and 26, the surface 250 is positioned on the head 254 and the laterally inward portion of the head 254 is comprised of the oblique surfaces 256 and 258. As shown in FIG. 26, the surface 256 is configured to engage the outer surface 258 of the base platform 230 to stop the rotation of the lock mechanism 244. Referring now to FIG. 24, it can be appreciated that the lock mechanism 244 comprises first and second lock arms 260 and 262 having an upper receiving surface 263.

Figure 28:
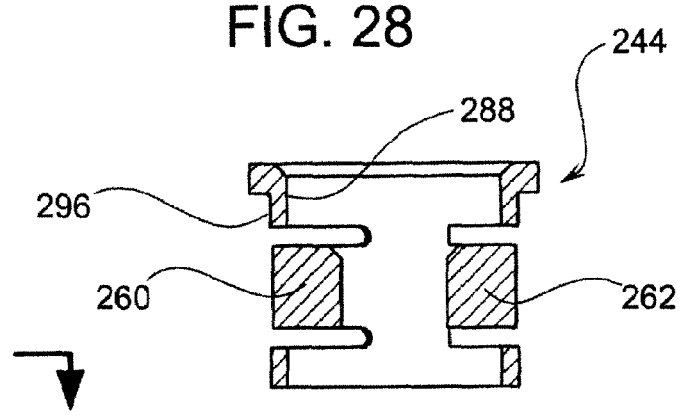
FIG. 28 shows a sectional view taken along line 28-28 of FIG. 7 of the lock mechanism.
Figure 29:
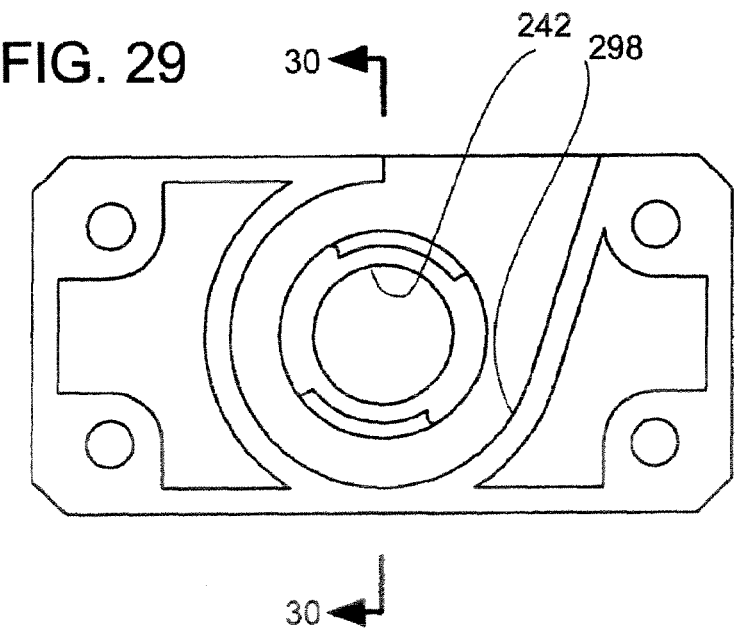
FIG. 29 is a bottom view showing the various surfaces of the base platform.
Figure 38:
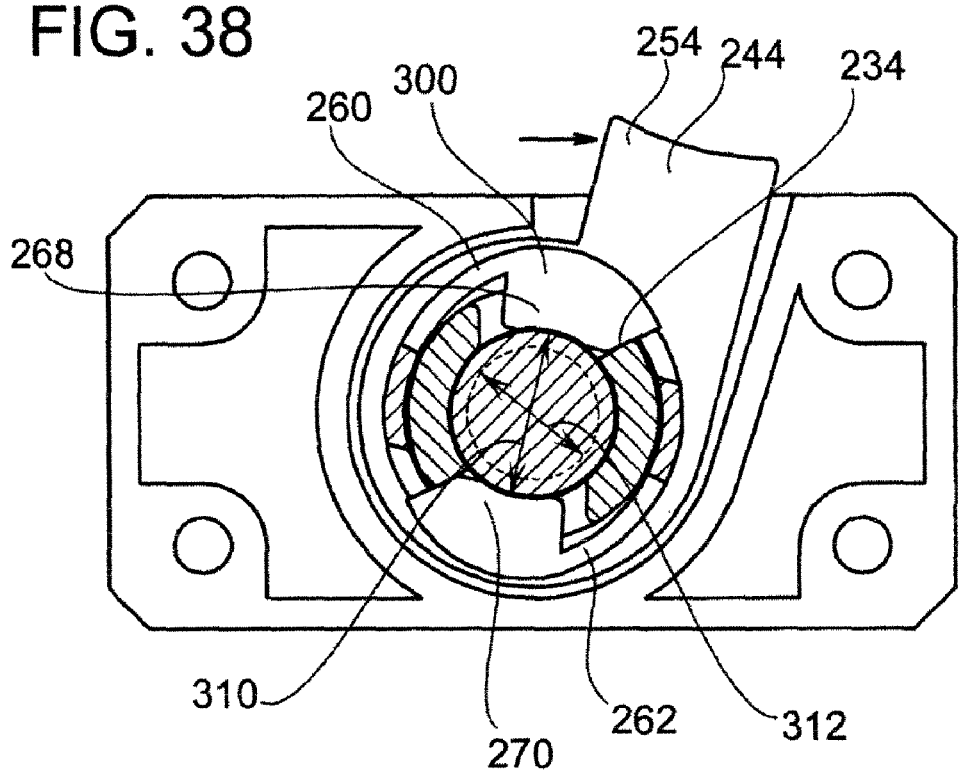
FIG. 38 schematically shows how the inner surface of the lock arms is beyond the outer circumference of the lower portion of the stem.

As shown in FIGS. 38 and 39, the lock arms 260 and 262 each have a base engagement surface 264 and 266. The base engagement surfaces are configured to engage the lock mechanism arm engagement surfaces 234 to reposition the radially inward lock extensions 268 and 270 from the radially inward position (the first position) as shown in FIG. 39 to the radially outward position (the second position) as shown in FIG. 38. As shown in FIG. 22, the lock arms 260 and 262 (where only lock arm 260 is shown in FIG. 22) comprise lower and upper surfaces 280 and 282 which are configured to be positioned within the surface defining the extension opening 240 as shown in FIG. 24. The lock mechanism 244 as shown in FIG. 28 further has the substantially conical inner surface 288 which is configured to engage the substantially conical surface 290 of the base extension 232 of the base portion 222. Further, the outer surface 296 as shown in FIG. 28 is configured to engage the lock mechanism receiving surface 298 as shown in FIG. 29. In general, the lock mechanism 244 receiving surface is in part a circular surface where the lock mechanism is rotatably mounted to the base portion 222.

Now referring to FIG. 23, there is shown a portion of the rod holder mount 220 where the stem portion 300 comprises a lower region 302 having a frustoconical portion 304. Further, the stem has a locking ring 306 and a lock portion 308. In general, the locking ring 216 has a diameter 310 that is greater than the diameter 312 of the lock portion 308. Referring now to FIGS. 38 and 39, it can be appreciated that the inward surface of the radially inward lock extensions 268 and 270 are configured to be positioned in the second position (as is shown in FIG. 38) to be equal to or greater than the diameter 310. As shown in FIG. 39, in the first position, the lock extensions 260 and 270 are the smaller diameter 312, thereby engaging the lock portion 308 such as shown in the exploded view in FIG. 23. It should be noted that in FIGS. 38 and 39, the lock arms 260 and 262 in one form are cantilevered-like springs which can be biasedly forced radially outwardly.

Referring back to FIGS. 36 and 37, it can be appreciated that the lock arms 260 and 262 in one form have a natural position where the radially inward lock extensions 268 and 270 are positioned inwardly. When an individual places a force, such as that indicated at 320, upon the head 254 of the lock mechanism 244, as introduced above, the base engagement surfaces 264 and 266 engage the lock mechanism engagement surfaces 234 where the oblique nature of the surfaces cause the radial outward movement of the radially inward lock extensions 268 and 270, and more notably the inward partially conical surfaces 269 and 271.

Now referring to FIGS. 33 and 34, it can be appreciated that the lower frustoconical surface 304 of the stem 300, in one form, can engage the upper receiving surface 263 of the lock member 244. As shown in FIG. 34, it can be appreciated that the outer stem diameter of the locking rings 306 maintain the lock arms 260 and 262 in the radially outward position (the second position as the rod holder mount 222 positions downwardly). Of course, in another form, the locking mechanism 244 can be manually repositioned to the second position with a force imposed upon the head portion 254 as shown in FIG. 38.

Referring back to FIG. 35, it can be appreciated that the lock arms 260 and 262 are configured to reposition radially inwardly back to the first position by way of the stored energy within the cantilevered spring portion of each of the lock arms, and the lower surfaces 267 and 269 are configured to engage the upper surface 217 of the locking ring 306 to maintain the stem 300 in a locked orientation. The jagged surface 320, which is common in the art, is configured to receive a receiving surface within the base portion 222 to orientate the rod holder mount 220 in a desired rotational location about a vertical axis.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A mount operatively configured to be positioned upon a surface base to mount a stem of a rod support mechanism thereto, the mount comprising:

a) a base portion comprising a lock mechanism receiving surface, the lock mechanism receiving surface having a circular surface portion and a lock mechanism arm engagement surface, b) a lock mechanism having a lock mechanism arm rotatably attached to the base portion, the lock mechanism arm comprising a base engagement surface that is operatively configured to engage the lock mechanism arm engagement surface such that when the lock mechanism rotates, the lock mechanism arm engages the base engagement surface to reposition at least one radially inward lock extension radially outward sufficient to allow the stem of the rod support mechanism to pass therethrough.

2. The mount as recited in claim 1 where the base portion comprises a base extension having a surface defining an extension opening, where the radially inward lock extensions are configured to extend radially inward into the extension openings.

3. The mount as recited in claim 2 where the base extension of the base portion has an inward substantially conical surface operatively configured to engage the stem of the rod support mechanism, the radially inward lock extension extending within a curved plane defined in part by an inward substantially conical surface of the stem when the lock mechanism is in a first position.

4. The mount as recited in claim 1 where a lower frustoconical surface of the stem is operatively configured to reposition a radially inward lock extension radially outwardly as the stem is positioned downwardly onto the base portion.

5. The mount as recited in claim 1 where first and second lock arms are utilized for locking the stem and attached to the locking mechanism.

6. The mount as recited in claim 5 where the first and second lock arms are mounted to the lock mechanism by way of a cantilevered spring.

7. The mount as recited in claim 6 where the first and second radially inward lock extensions each have a base engagement surface which slidably engages a first and second lock mechanism arm engagement surface of the base portion to reposition the radially inward lock extensions radially outwardly to remove or attach the stem to the base portion.

8. A method of positioning a rod holder comprising the steps of:
   a) retrieving a fishing rod support mechanism having a stem and fixedly positioning a base portion to a base, where the support mechanism has a locking mechanism attached thereto and the base portion has an upper region with a surface defining a vertically orientated opening,
   b) positioning the stem in the surface defining a vertically orientated opening and positioning the stem downwardly to bias the locking mechanism to an open orientation where a lower annular lip of the stem engages at least one lock arm rotatably attached to the locking mechanism and the lock arm rotates to increase the surfaces of the lock arm defining an open area,
   c) further positioning the stem downwardly where the locking mechanism engages an elongated region of the stem where the stem is locked to a base support which is comprised of the base portion and the lock arm,
   d) repositioning the fishing rod support mechanism by rotation about a vertical axis,
   e) lowering the stem further so a rotational locking surface of the stem engages an inward locking extension surface of the base portion to rotationally lock the fishing rod support mechanism to the base portion.

9. The method as recited in claim 8 where the lock arm has a protruding release extending upon a lateral portion of the base portion and configured to rotate with respect to the base portion.

10. The method as recited in claim 9 where a biasing region is a part of the locking arm and is positioned on the opposing lateral region of the protruding release within the base portion.

11. The method as recited in claim 10 where a rotational locking surface of the stem is positioned above an elongated lock portion and the stem locking surface is positioned above the locking mechanism.

12. The method as recited in claim 11 whereby the fishing rod support mechanism is repositioned about the vertical axis where the fishing rod support mechanism is lifted in the vertical direction and rotated about the vertical axis and positioned downwardly so the rotational locking surface of the stem engages the stem locking surface to rotationally reposition the fishing rod support mechanism with respect to the base portion.

13. The method as recited in claim 8 where the fishing rod support mechanism is removed by repositioning the locking arm when the lock arm is rotated to a stored energy state so a first portion of the radially inward lock extensions allows the lower annular lip to freely pass therethrough where the locking mechanism is biased against a biasing member from a locked orientation to an unlocked orientation.

14. A fishing rod holder assembly comprising:
   a) a fishing rod support mechanism having a rod holder and a stem mount portion,
   b) a rod holder mount having a base portion providing a surface defining a vertically orientated opening and a lock mechanism arm engagement surface,
   c) a locking mechanism having an inner surface of a first lock arm adapted to allow a stem to pass therethrough where the inner surface comprises a lock portion that is adapted to engage an elongated region of the stem where the lock portion does not allow a lower annular lip to pass vertically thereby the surface defining a vertically orientated opening, a rotational biasing member positions the locking mechanism to a locked position with respect to the base portion, a lock arm comprising a base engagement surface that is operatively configured to engage the lock mechanism arm engagement surface such that when the locking mechanism rotates, the lock arm engages a base engagement surface to reposition radially inward lock extensions radially outwardly sufficient to allow the stem of the rod support mechanism to pass therethrough,
   d) whereas the stem mount portion comprises a rotational locking surface that is adapted to engage a stem locking surface of the base portion to rotationally position the fishing rod support mechanism with respect to the base portion.

15. The fishing rod holder assembly as recited in claim 14, wherein the lock arm is a first lock arm and where a second lock arm cooperates with said first lock arm to maintain the locking mechanism in a locked orientation with respect to the base portion.

16. The fishing rod holder assembly as recited in claim 15 where the first and the second lock arms are a unitary structure with the locking mechanism.

17. The fishing rod holder assembly as recited in claim 14 where the first and the second lock arms are mounted to the lock mechanism by way of the cantilevered spring.

18. The fishing rod holder assembly as recited in claim 17 where the base comprises the perimeter portion of a water vessel.

\* \* \* \* \*